United States Patent Office 3,446,595
Patented May 27, 1969

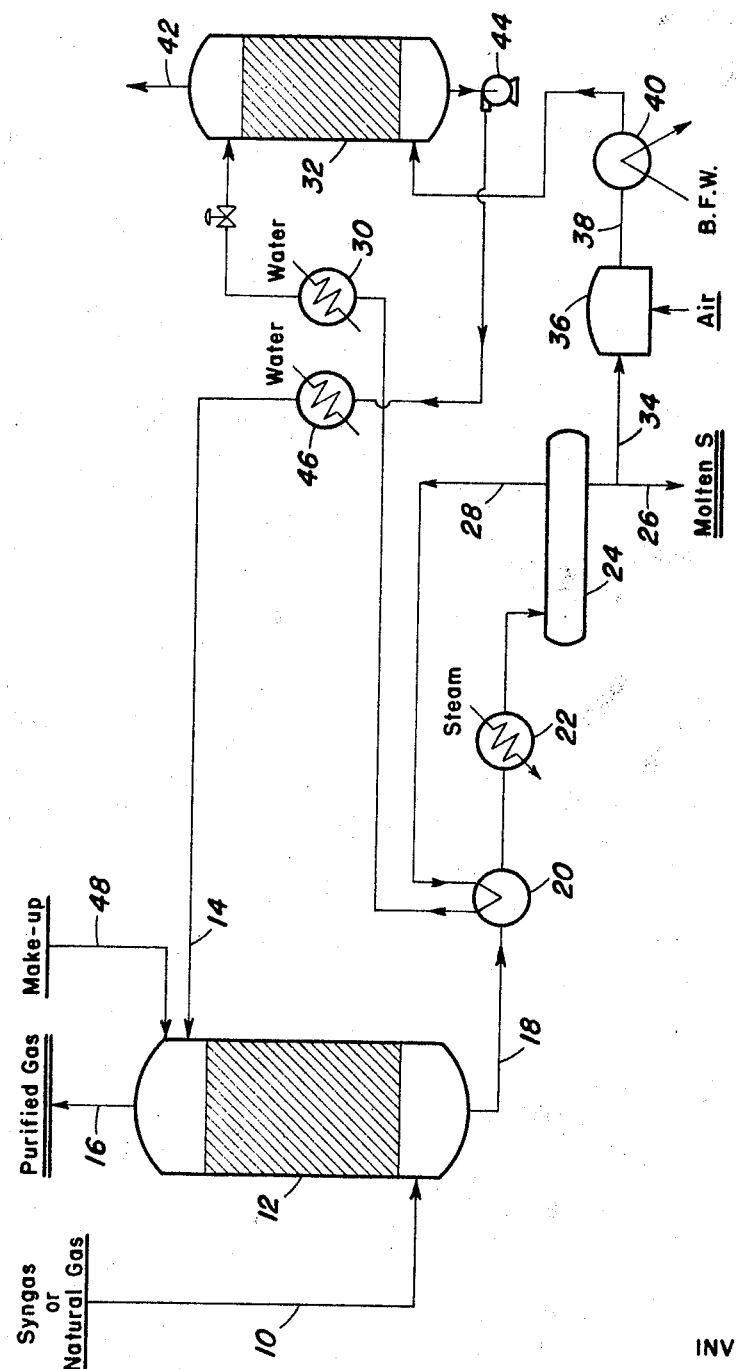

3,446,595
GAS PURIFICATION PROCESS
Salvatore A. Guerrieri, Rowayton, Conn., assignor to The Lummus Company, New York, N.Y., a corporation of Delaware
Filed Mar. 17, 1966, Ser. No. 536,944
Int. Cl. B01d 53/00, 53/34; C01b 17/04
U.S. Cl. 23—225                                   8 Claims

ABSTRACT OF THE DISCLOSURE

Process for removing hydrogen sulfide from a gaseous stream wherein the gaseous stream is contacted with a liquid containing sodium bisulfite in the substantial absence of oxygen to produce elemental sulfur and sodium sulfate. The elemental sulfur is separated from the liquid and the liquid contacted with sulfur dioxide, preferably produced by burning a portion of the recovered elemental sulfur to regenerate sodium bisulfite. The process results in a net production of sulfur and utilities.

---

This invention relates generally to the purification of gaseous streams and, more particularly, the invention is concerned with the removal of hydrogen sulfide from hydrocarbon gaseous streams such as natural gas, other gas streams such as synthesis gas, and the like.

Gaseous mixtures called "synthesis gas" have wide utility and are of particular significance as a feed stock for the manufacture of ammonia, catalytic hydrogenation processes and the like. Feed gas is conventionally known in the art as "synthesis gas" and this term is used herein for purposes of convenience; it is employed to designate the products of gas generation irrespective of their intended use. Synthesis gases may be generated from a variety of source materials, and the present invention concerns any such gases wherein sulfur is an impurity. For example, in steam reforming operations wherein natural gas or other petroleum-base feed stocks are reformed into hydrogen-rich gas mixtures, a variety of impurities are also produced in the reforming operation, or may be in the feed stock originally. These impurities include sulfur and organosulfur compounds which are generally converted to $H_2S$, and are removed as such. Carbon dioxide is another common impurity.

In the production of ammonia synthesis gas, wherein hydrogen and nitrogen in a three to one molar ratio is the desired reactant composition, hydrogen sulfide, carbon dioxide, and carbon monoxide should all be removed from the stream prior to the synthesis reaction.

There are a number of conventional methods for the removal of sulfur from such gaseous streams. Scrubbing the gas with an ethanolamine solution is one such method; alternatively the gas may be passed countercurrent to a sulfur dioxide bearing solution to react the $SO_2$ with contained $H_2S$ in the gas, producing elemental sulfur and water, the sulfur being removed by filtration. The sulfur dioxide is generated by burning all or a part of the recovered sulfur in air. Such processes generally suffer from one of two defects; either they consume valuable reagents or they are substantial consumers of utilities. While recovery of reagents is generally possible, this also adds to both capital and operating cost. Utility costs are of course unrecoverable.

It is thus a general object of the present invention to provide an improved method for removing $H_2S$ from a gas stream.

Another object of the invention is to provide a process for removing $H_2S$ from gas streams which does not use significant quantities of reagents.

Still another object of the invention is to provide a process for removing $H_2S$ from gas streams which is not a consumer of utilities.

Yet another object of the invention is to provide a process for removing $H_2S$ impurities from gas streams which operates at relatively low temperatures and pressures, and which is a net producer of utilities.

Various other objects and advantages of the invention will become clear from the following discussion of an embodiment thereof, and the novel features will be particularly pointed out in connection with the appended claims.

In essence, the process of the invention is based on the known reaction of hydrogen sulfide with sodium bisulfite to form elemental sulfur. The invention includes a novel method of carrying out this reaction, separating sulfur, reconstituting the reactant solution and recycling it for reaction with additional quantities of gas. Briefly, the process comprises initially contacting the gas stream countercurrently with an amount of sodium bisulfite substantially in excess of the amount stoichiometrically required to remove all of the hydrogen sulfide. This is carried out in any suitable gas-liquid contacting device such as a packed column or a bubble cap tower. The purified gas is removed as product and the liquid stream is heated and passed to a settler where sulfur is removed. Temperatures employed during the contacting step are not critical, but a range of 70° to 150° F. is preferred. Temperatures up to 320° F. may be employed provided that the reaction is carried out at a suitably high pressure. This will be done only if such pressure fits into the overall syngas process.

To achieve a good separation in the settler, however, the sulfur should be molten but not viscous; temperatures should therefore be in the range of 250° F., just above the melting point, to 320° F., the temperature above which viscosity of sulfur increases abruptly. Of course, if the contactor is operated at the higher temperature, the related heat exchange equipment will be somewhat different.

The salt solution is cooled after leaving the settler and passed to a second gas-liquid contacting device, where bisulfite is regenerated by contact with $SO_2$. The $SO_2$ is generated by burning a portion of the recovered sulfur in air. The reconstituted bisulfite solution is again cooled and returned to the first absorber for contact with additional quantities of $H_2S$-bearing gas. As pointed out in more detail hereinbelow, the process is a net producer of elemental sulfur and utilities.

A better understanding of the invention will be gained from the following detailed discussion of an embodiment thereof, taken in conjunction with the accompanying drawing, which is a simplified, schematic flowsheet of the same.

With reference to the drawing, feed gas in line 10 is fed, at normal line pressures, into absorber 12, where it is passed countercurrently to a sodium bisulfite solution from line 14. The reaction is as follows:

$2NaHSO_3 + 2H_2S \rightarrow Na_2SO_3 + 3S$
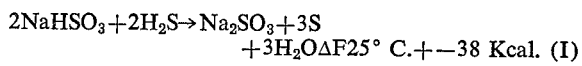
$+ 3H_2O \Delta F 25° C. + -38$ Kcal. (I)

As the amount of hydrogen sulfide contained in the gas stream is generally not more than a few percent, it is not difficult to pass a substantial stoichiometric excess of bisulfite solution through absorber 12. To insure complete removal of the $H_2S$ the absorber should be run at about 70° to 150° F. Because the reaction is exothermic, it may be necessary to remove heat at intermediate points in this absorber to maintain the desired temperature. Also, suitable means should be employed to prevent carry-over of $SO_2$ mist by the purified gas. As noted above, while the higher temperatures may be used, the lower temperatures are preferred because this favors solubility of $H_2S$ and therefore more rapid reaction (albeit reaction rate rises with temperature).

Purified, substantially sulfur-free gas is removed overhead in line 16 and passed to further purification ($CO_2$ removal, etc.) or whatever is required. The bisulfite solution, now containing sodium sulfite, elemental sulfur and water, passes out of absorber 12 in line 18. It is heated first by indirect heat exchange with bisulfite solution in exchanger 20, and is further heated indirectly with steam in exchanger 22. As noted above, temperature of the solution at this point should be in the range of 250° to 320° F., and the pressure should be high enough to prevent boiling in the settler.

The hot solution passes into pressure settler 24, where molten sulfur is removed in line 26. Pressure in the settler should be at least the saturation pressure of water at operating temperature so as to prevent any vapor formation and to insure good separation. Generally 15–85 p.s.i.g. minimum is satisfactory. The sulfur-free bisulfite solution is passed out of settler 24 in line 28, and a portion of its sensible heat is given up to the cooler solution in exchanger 20. The solution is further cooled by water in exchanger 30, after which it is passed to $SO_2$ absorber 32.

Reconstitution of the absorber solution is carried out by the following reaction:

$$Na_2SO_3 + H_2O + SO_2 \rightarrow 2NaHSO_3 \quad (II)$$

There is sufficient water in the stream as a result of reaction (I). Sulfur dioxide is generated by taking a portion of the elemental sulfur and passing it via line 34 to burner 36. Air is admitted to burner 36 in just about the stoichiometric amount required to produce the $SO_2$, as it is desirable to minimize the amount of oxygen in the combustion gases. The combustion gases, including $SO_2$, $N_2$ and a minimal amount of $O_2$, are passed in line 38 to exchanger 40 where steam is generated and the gases are cooled. The cooled gases then pass to absorber 32 for regeneration of $NaHSO_3$ by reaction (II). Temperatures in absorber 32 should be as low as possible, preferably in the range of 70° to 120° F., so as to minimize the vapor pressure of $SO_2$ over the $NaHSO_3$—$NaSO_3$ solution.

The $SO_2$-free combustion gases are vented through line 42. The reconstituted bisulfite is removed from absorber 32 and pumped (44) into line 14 for recycle to $H_2S$ absorber 12. Temperature is controlled by exchanger 46 in line 20.

It is desirable for there to be a minimum of free oxygen in the system to avoid the oxidation of sulfides to thiosulfate. This is true with both the feed gas (line 10) and the combustion gases (line 38). As make-up solution is required, however, it can be added via line 48. Sodium hydroxide or sodium carbonate are suitable for this purpose.

As is clear from a comparison of reactions (I) and (II), more water is produced than is consumed. To prevent undue dilution of the bisulfite over extended periods, $SO_2$ absorber 32 can be operated at temperatures and pressures which allow excess water to be vented with residue gas through line 42.

The process, in addition to producing elemental sulfur, is also a net producer of utilities. This is so because $\Delta H$, the heat of reaction for the overall equation $$H_2S + \tfrac{1}{2}O_2 \rightleftharpoons H_2O + S \quad (III)$$

is equal to $\Delta H_w$, the heat of formation of water, minus $\Delta H_{H_2S}$, the heat of formation of hydrogen sulfide, and is approximately 95,500 B.t.u. per mol of $H_2S$ at 25° C. Thus, in a plant removing 100 pound mols of $H_2S$ per hour from a gas stream, there will be a net product of 9.5 million B.t.u.'s, which can be recovered for example, as about 9,500 pounds of 150 p.s.i.g. steam per hour. Obviously, actual recovery will be somewhat less due to thermodynamic inefficiencies in the process.

Various changes in the details, steps, materials and arrangements of parts, which have been herein described and illustrated in order to explain the nature of the invention, may be made by those skilled in the art within the principle and scope of the invention as defined in the appended claims. In particular, it will be noted that processing units other than those described may be employed with equal success.

What is claimed is:

1. A process for removing hydrogen sulfide from a gaseous stream containing same comprising:
    contacting said gaseous stream with a liquid containing a stoichiometric excess of sodium bisulfite said contacting being effected in the substantial absence of oxygen to prevent the formation of thiosulfate, to convert said hydrogen sulfide to elemental sulfur;
    recovering said gaseous stream free of hydrogen sulfide;
    separating said elemental sulfur from said liquid, at a temperature in the range of 250° to 320° F.;
    reacting said liquid with sulfur dioxide after removal of said elemental sulfur, whereby sodium bisulfite is regenerated; and
    recycling the liquid to said contacting step.

2. The process as claimed in claim 1, wherein said separation step is carried out at a pressure of at least 15 p.s.i.g.

3. The process as claimed in claim 1, wherein said liquid is heated to 250° to 320° F. in part by indirect heat exchange with liquid from which sulfur has been removed prior to said separation step.

4. The process as claimed in claim 1, and additionally comprising burning a portion of said elemental sulfur with a limited quantity of air to form sulfur dioxide, and using said sulfur dioxide to regenerate said sodium bisulfite.

5. Continuous process for removing hydrogen sulfide from a gaseous stream containing same comprising:
    passing said gaseous stream in continuous, counter current contact with a liquid containing a stoichiometric excess of sodium bisulfite in the substantial absence of oxygen to prevent the formation of thiosulfate, said bisulfite reacting with said hydrogen sulfide with the production of a mixture of elemental sulfur, sodium sulfite, unreacted sodium bisulfite and water;
    recovering said gaseous stream free of hydrogen sulfide;
    heating said mixture to a temperature within the range of 250° to 320° F.;
    separating said elemental sulfur from said mixture at a pressure of at least 15 p.s.i.g.;
    burning a portion of said elemental sulfur in air to produce sulfur dioxide;
    passing said sulfur dioxide in counter current contact with said mixture to convert sodium sulfite and water to sodium bisulfite; and
    recycling said sodium bisulfite containing liquid to the first contacting step for reaction with additional quantities of hydrogen-sulfide bearing gas.

6. The process as claimed in claim 5, and additionally comprising utilizing the elemental sulfur-free liquid mixture to heat, at least in part, the sulfur-bearing liquid mixture.

7. The process as claimed in claim 5, and additionally comprising:
    recovering heat from the combustion products of said burning step prior to reaction with said mixture;
    recovering heat from said liquid mixture prior to reaction with sulfur dioxide, and
    recovering heat from said liquid mixture prior to said recycling step.

8. The process as claimed in claim 5, wherein the quantity of air employed in said burning step is controlled so as to minimize the amount of free oxygen in the combustion products thereof.

(References on following page)

References Cited

UNITED STATES PATENTS

| | | | |
|---|---|---|---|
| 1,700,698 | 12/1929 | Fullweiler | 23—225 |
| 2,052,892 | 9/1936 | Murray | 23—225 |
| 2,909,407 | 10/1959 | Ahlborg et al. | 23—129 |

OSCAR R. VERTIZ, *Primary Examiner.*

G. O. PETERS, *Assistant Examiner.*

U.S. Cl. X.R.

23—130, 2